(12) United States Patent
Balogh et al.

(10) Patent No.: US 7,047,258 B2
(45) Date of Patent: May 16, 2006

(54) METHOD AND SYSTEM FOR VALIDATING REMOTE DATABASE UPDATES

(75) Inventors: Aristotle Nicholas Balogh, Oakton, VA (US); Bradley Thomas McMillen, McLean, VA (US)

(73) Assignee: VeriSign, Inc., Mountain View, CA (US)

( * ) Notice: Subject to any disclaimer, the term of this patent is extended or adjusted under 35 U.S.C. 154(b) by 343 days.

(21) Appl. No.: 10/285,547

(22) Filed: Nov. 1, 2002

(65) Prior Publication Data

US 2003/0084074 A1 May 1, 2003

Related U.S. Application Data

(60) Provisional application No. 60/330,842, filed on Nov. 1, 2001, provisional application No. 60/365,169, filed on Mar. 19, 2002.

(51) Int. Cl.
G06F 17/30 (2006.01)

(52) U.S. Cl. .......................... 707/201; 707/8

(58) Field of Classification Search .................. 707/1, 707/2, 3, 4, 5, 6, 7, 8, 9, 10, 100, 104.1, 201, 707/202, 203, 101, 102, 200; 395/610
See application file for complete search history.

(56) References Cited

U.S. PATENT DOCUMENTS

| | | | |
|---|---|---|---|
| 5,924,096 A | 7/1999 | Draper et al. .................. 707/10 |
| 5,926,816 A * | 7/1999 | Bauer et al. .................... 707/8 |
| 5,970,492 A | 10/1999 | Nielsen ........................ 707/10 |
| 6,216,135 B1 | 4/2001 | Brodersen et al. ........... 707/201 |
| 6,243,715 B1 | 6/2001 | Bogantz et al. .............. 707/201 |
| 6,411,966 B1 * | 6/2002 | Kwan et al. ................. 707/201 |
| 6,615,223 B1 * | 9/2003 | Shih et al. ................... 707/201 |
| 6,625,621 B1 * | 9/2003 | Tan et al. .................... 707/201 |
| 6,643,669 B1 * | 11/2003 | Novak et al. ................ 707/201 |

OTHER PUBLICATIONS

Oracle8/Parallel Server Concepts and Administration, Release 8.1.5, Chapter 10: Non-PCM Instance Locks [online], [retrieved on Jan. 23, 2003], 4 pages.

* cited by examiner

Primary Examiner—Apu Mofiz
Assistant Examiner—Yicun Wu
(74) Attorney, Agent, or Firm—Kenyon & Kenyon LLP

(57) ABSTRACT

Embodiments of the present invention provide a method and system for validating remote database updates over a network. A local database record and a remote database record may be compared and exceptions may be generated. Each exception may describe a discrepancy between the remote and local database records. An exception identifier may be associated with each exception, where the exception identifier may be associated with an identifier of the record. An event identifier may be associated with each event in the update, where the event identifier may be associated with an identifier of the record. The events and exceptions that correspond to the record may be compared to determine whether the update is valid.

19 Claims, 11 Drawing Sheets

300

| Sendfile ID | Generation Time | N (Number Transactions in Sendfile) | Total Size of Sendfile | Checksum | Transaction 1 | ... | Transaction N |
|---|---|---|---|---|---|---|---|
| 400 | 402 | 404 | 406 | 408 | 410-1 | | 410-N |

| Initializing Sendfile ID | Generation Time | N (Number Transactions in Initializing Sendfile) | Total Size of Initializing Sendfile | Checksum | Last Sendfile Generated | Last Transaction Committed | Data |
|---|---|---|---|---|---|---|---|
| 500 | 502 | 504 | 506 | 508 | 510 | 512 | 516 |

FIG. 5

METHOD AND SYSTEM FOR VALIDATING REMOTE DATABASE UPDATES

CLAIM FOR PRIORITY/CROSS REFERENCE TO RELATED APPLICATIONS

This non-provisional application claims the benefit of U.S. Provisional Patent Application No. 60/330,842, filed Nov. 1, 2001, which is incorporated by reference in its entirety, and U.S. Provisional Patent Application No. 60/365,169, filed Mar. 19, 2002, which is incorporated by reference in its entirety. This application is related to U.S. Non-Provisional patent application Ser. Nos. 10/285,618, 10/285,575, 10/285,544, 10/285,549.

TECHNICAL FIELD

Embodiments of the present invention relate generally to computer databases. More specifically, the embodiments provide a method and system for reliably validating remote database updates.

BACKGROUND OF THE INVENTION

With the increasing size and highly distributed structure of databases, it has become increasingly difficult to ensure that related databases in a network contain the same versions of the data. If there are significant changes to one database, other databases may need to be updated to include these changes as soon as possible. Making these updates may involve frequently moving large amount of updating data to multiple databases. The potential complexity of such a process can be tremendous.

This problem is further compounded in systems where communications are unreliable. In this case, data may be lost during transport. As such, data must be retransmitted and the other databases updated all over again. Such repetition significantly reduces the efficiency of the system and the extent to which the databases contain up-to-date data.

BRIEF DESCRIPTION OF THE DRAWINGS

FIG. 4 shows a sendfile according to an embodiment of the present invention.

FIG. 5 shows an initializing sendfile according to an embodiment of the present invention.

DETAILED DESCRIPTION

Embodiments of the present invention provide a method and system for validating remote database updates over a network. A local database record and a remote database record may be compared and exceptions may be generated. Each exception may describe a discrepancy between the remote and local database records. An exception identifier may be associated with each exception, where the exception identifier may be associated with an identifier of the record. An event identifier may be associated with each event in the update, where the event identifier may be associated with an identifier of the record. The events and exceptions that correspond to the record may be compared to determine whether the update is valid.

Figure 1:
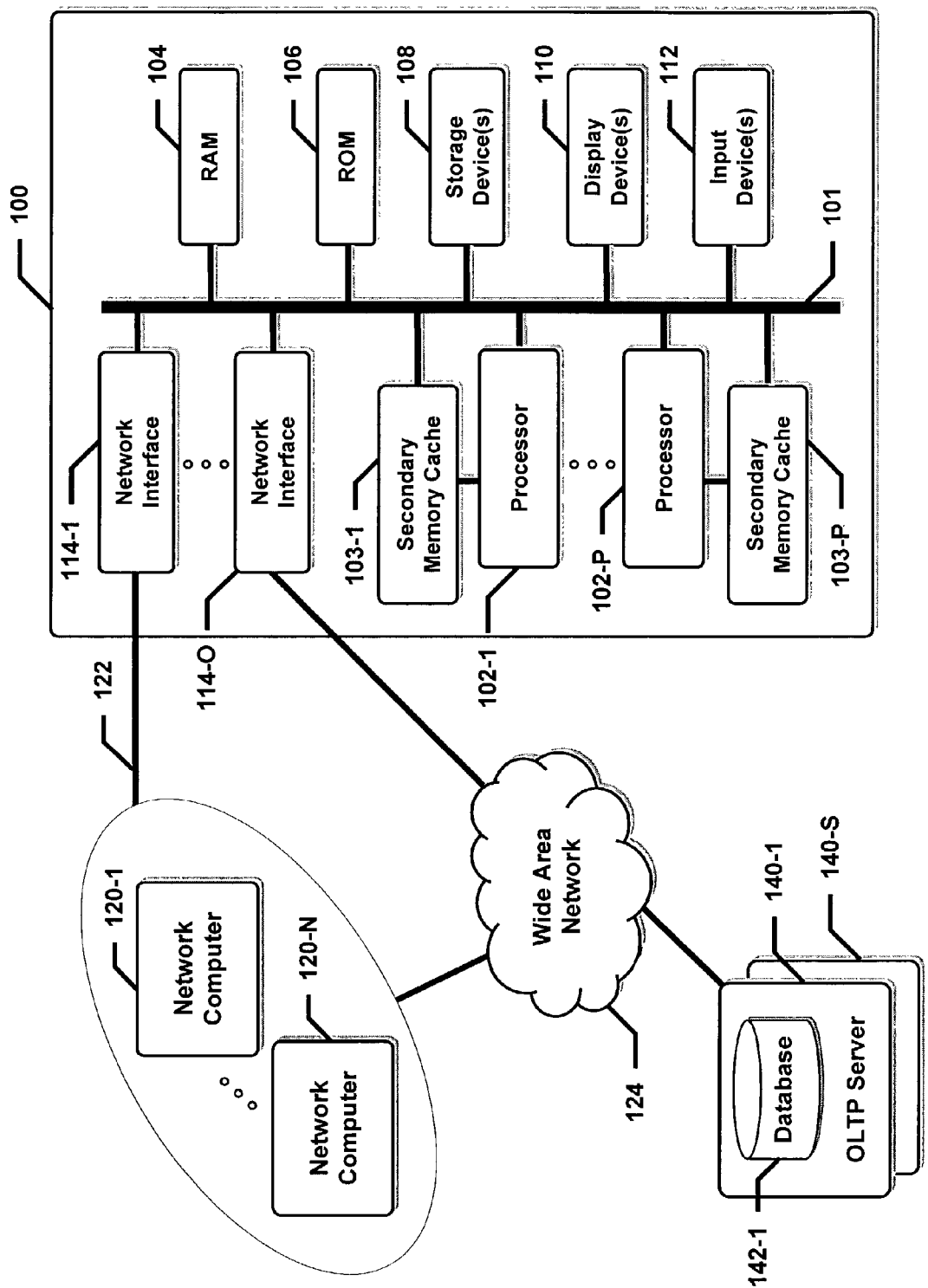
FIG. 1 is a system block diagram, according to an embodiment of the present invention.

FIG. 1 is a block diagram that illustrates a system according to an embodiment of the present invention. Generally, system 100 may host a large, memory-resident database, receive search requests and provide search responses over a network. For example, system 100 may be a symmetric, multiprocessing (SMP) computer, such as, for example, an IBM RS/6000® M80 or S80 manufactured by International Business Machines Corporation of Armonk, N.Y., a Sun Enterprise™ 10000 manufactured by Sun Microsystems, Inc. of Santa Clara, Calif., etc. System 100 may also be a multi-processor personal computer, such as, for example, a Compaq ProLiant™ ML530 (including two Intel Pentium® III 866 MHz processors) manufactured by Hewlett-Packard Company of Palo Alto, Calif. System 100 may also include a multiprocessing operating system, such as, for example, IBM AIX® 4, Sun Solaris™ 8 Operating Environment, Red Hat Linux® 6.2, etc. System 100 may receive periodic updates over network 124, which may be concurrently incorporated into the database. Embodiments of the present invention may achieve very high database search and update throughput by incorporating each update to the database without the use of database locks or access controls.

In an embodiment, system 100 may include at least one processor 102-1 coupled to bus 101. Processor 102-1 may include an internal memory cache (e.g., an L1 cache, not shown for clarity). A secondary memory cache 103-1 (e.g., an L2 cache, L2/L3 caches, etc.) may reside between processor 102-1 and bus 101. In a preferred embodiment, system 100 may include a plurality of processors 102-1 . . . 102-P coupled to bus 101. A plurality of secondary memory caches 103-1 . . . 103-P may also reside between plurality of processors 102-1 . . . 102-P and bus 101 (e.g., a look-through architecture), or, alternatively, at least one secondary memory cache 103-1 may be coupled to bus 101 (e.g., a look-aside architecture). System 100 may include memory 104, such as, for example, random access memory (RAM), etc., coupled to bus 101, for storing information and instructions to be executed by plurality of processors 102-1 . . . 102-P.

Memory 104 may store a large database, for example, for translating Internet domain names into Internet addresses, for translating names or phone numbers into network addresses, for providing and updating subscriber profile data, for providing and updating user presence data, etc. Advantageously, both the size of the database and the number of translations per second may be very large. For example, memory 104 may include at least 64 GB of RAM and may host a 500M (i.e., 500×10$^6$) record domain name database, a 500M record subscriber database, a 450M record telephone number portability database, etc.

On an exemplary 64-bit system architecture, such as, for example, a system including at least one 64-bit big-endian processor 102-1 coupled to at least a 64-bit bus 101 and a 64-bit memory 104, an 8-byte pointer value may be written to a memory address on an 8-byte boundary (i.e., a memory address divisible by eight, or, e.g., 8N) using a single, uninterruptible operation. Generally, the presence of secondary memory cache 103-1 may simply delay the 8-byte pointer write to memory 104. For example, in one embodiment, secondary memory cache 103-1 may be a look-through cache operating in write-through mode, so that a single, 8-byte store instruction may move eight bytes of data from processor 102-1 to memory 104, without interruption, and in as few as two system clock cycles. In another embodiment, secondary memory cache 1031 may be a look-through cache operating in write-back mode, so that the 8-byte pointer may first be written to secondary memory cache 103-1, which may then write the 8-byte pointer to memory 104 at a later time, such as, for example, when the cache line in which the 8-byte pointer is stored is written to memory 104 (i.e., e.g., when the particular cache line, or the entire secondary memory cache, is "flushed").

Ultimately, from the perspective of processor 102-1, once the data are latched onto the output pins of processor 102-1, all eight bytes of data are written to memory 104 in one contiguous, uninterrupted transfer, which may be delayed by the effects of a secondary memory cache 103-1, if present. From the perspective of processors 102-2 . . . 102-P, once the data are latched onto the output pins of processor 102-1, all eight bytes of data are written to memory 104 in one contiguous, uninterrupted transfer, which is enforced by the cache coherency protocol across secondary memory caches 103-1 . . . 103-P, which may delay the write to memory 104 if present.

However, if an 8-byte pointer value is written to a misaligned location in memory 104, such as a memory address that crosses an 8-byte boundary, all eight bytes of data can not be transferred from processor 102-1 using a single, 8-byte store instruction. Instead, processor 102-1 may issue two separate and distinct store instructions. For example, if the memory address begins four bytes before an 8-byte boundary (e.g., 8N−4), the first store instruction transfers the four most significant bytes to memory 104 (e.g., 8N−4), while the second store instruction transfers the four least significant bytes to memory 104 (e.g., 8N). Importantly, between these two separate store instructions, processor 102-1 may be interrupted, or, processor 102-1 may loose control of bus 101 to another system component (e.g., processor 102-P, etc.). Consequently, the pointer value residing in memory 104 will be invalid until processor 102-1 can complete the second store instruction. If another component begins a single, uninterruptible memory read to this memory location, an invalid value will be returned as a presumably valid one.

Similarly, a new 4-byte pointer value may be written to a memory address divisible by four (e.g., 4N) using a single, uninterruptible operation. Note that in the example discussed above, a 4-byte pointer value may be written to the 8N−4 memory location using a single store instruction. Of course, if a 4-byte pointer value is written to a location that crosses a 4-byte boundary, e.g., 4N−2, all four bytes of data can not be transferred from processor 102-1 using a single store instruction, and the pointer value residing in memory 104 may be invalid for some period of time.

System 100 may also include a read only memory (ROM) 106, or other static storage device, coupled to bus 101 for storing static information and instructions for processor 102-1. A storage device 108, such as a magnetic or optical disk, may be coupled to bus 101 for storing information and instructions. System 100 may also include display 110 (e.g., an LCD monitor) and input device 112 (e.g., keyboard, mouse, trackball, etc.), coupled to bus 101. System 100 may include a plurality of network interfaces 114-1 . . . 114-O, which may send and receive electrical, electromagnetic or optical signals that carry digital data streams representing various types of information. In an embodiment, network interface 114-1 may be coupled to bus 101 and local area network (LAN) 122, while network interface 114-O may coupled to bus 101 and wide area network (WAN) 124. Plurality of network interfaces 114-1 . . . 114-O may support various network protocols, including, for example, Gigabit Ethernet (e.g., IEEE Standard 802.3-2002, published 2002), Fiber Channel (e.g., ANSI Standard X.3230-1994, published 1994), etc. Plurality of network computers 120-1 . . . 120-N may be coupled to LAN 122 and WAN 124. In one embodiment, LAN 122 and WAN 124 may be physically distinct networks, while in another embodiment, LAN 122 and WAN 124 may be via a network gateway or router (not shown for clarity). Alternatively, LAN 122 and WAN 124 may be the same network.

As noted above, system 100 may provide DNS resolution services. In a DNS resolution embodiment, DNS resolution services may generally be divided between network transport and data look-up functions. For example, system 100 may be a back-end look-up engine (LUE) optimized for data look-up on large data sets, while plurality of network computers 120-1 . . . 120-N may be a plurality of front-end protocol engines (PEs) optimized for network processing and transport. The LUE may be a powerful multiprocessor server that stores the entire DNS record set in memory 104 to facilitate high-speed, high-throughput searching and updating. In an alternative embodiment, DNS resolution services may be provided by a series of powerful multiprocessor servers, or LUEs, each storing a subset of the entire DNS record set in memory to facilitate high-speed, high-throughput searching and updating.

Conversely, the plurality of PEs may be generic, low profile, PC-based machines, running an efficient multitasking operating system (e.g., Red Hat Linux® 6.2), that minimize the network processing transport load on the LUE in order to maximize the available resources for DNS resolution. The PEs may handle the nuances of wire-line DNS protocol, respond to invalid DNS queries and multiplex valid DNS queries to the LUE over LAN 122. In an alternative embodiment including multiple LUEs storing DNS record subsets, the PEs may determine which LUE should receive each valid DNS query, and multiplex valid DNS queries to the appropriate LUEs. The number of PEs for a single LUE may be determined, for example, by the number of DNS queries to be processed per second and the performance characteristics of the particular system. Other metrics may also be used to determine the appropriate mapping ratios and behaviors.

Generally, other large-volume, query-based embodiments may be supported, including, for example, telephone number resolution, SS7 signaling processing, geolocation determination, telephone number-to-subscriber mapping, subscriber location and presence determination, etc.

In an embodiment, a central on-line transaction processing (OLTP) server 140-1 may be coupled to WAN 124 and receive additions, modifications and deletions (i.e., update traffic) to database 142-1 from various sources. OLTP server 140-1 may send updates to system 100, which includes a local copy of database 142-1, over WAN 124. OLTP server 140-1 may be optimized for processing update traffic in various formats and protocols, including, for example, HyperText Transmission Protocol (HTTP), Registry Registrar Protocol (RRP), Extensible Provisioning Protocol (EPP), Service Management System/800 Mechanized Generic Interface (MGI), and other on-line provisioning protocols. A constellation of read-only LUEs may be deployed in a hub and spoke architecture to provide high-speed search capability conjoined with high-volume, incremental updates from OLTP server 140-1.

In an alternative embodiment, data may be distributed over multiple OLTP servers 140-1 . . . 140-S, each of which may be coupled to WAN 124. OLTP servers 140-1 . . . 140-S may receive additions, modifications, and deletions (i.e., update traffic) to their respective databases 142-1 . . . 142-S (not shown for clarity) from various sources. OLTP servers 140-1 . . . 140-S may send updates to system 100, which may include copies of databases 142-1 . . . 142-S, other dynamically-created data, etc., over WAN 124. For example, in a geolocation embodiment, OLTP servers 140-1 . . . 140-S may receive update traffic from groups of remote sensors. In another alternative embodiment, plurality of network computers 120-1 . . . 120-N may also receive additions, modifications, and deletions (i.e., update traffic) from various sources over WAN 124 or LAN 122. In this embodiment, plurality of network computers 120-1 . . . 120-N may send updates, as well as queries, to system 100.

In an embodiment, system 100 may include a remote database (e.g., remote database 210). New information, or update traffic, may be received, for example, over WAN 124 from OLTP server 140-1. In an embodiment, the new information may include modifications to at least one existing element within the remote database. System 100 may create a new remote database element based on the new information received over the network, and without restricting search access to the remote database, write a pointer to the new element to the remote database using a single uninterruptible operation, such as, for example, a store instruction. In an embodiment, processor 102-1 may include a word size of at least n-bytes, memory 104 may include a width of at least n-bytes and the store instruction may write n-bytes to a remote memory address located on an n-byte boundary. In another embodiment, system 100 may physically delete an existing element from memory 104, corresponding to the new element, after the pointer is written to the remote database.

In the DNS resolution embodiment, each PE (e.g., each of the plurality of network computers 120-1 . . . 120-N) may combine, or multiplex, several DNS query messages, received over a wide area network (e.g., WAN 124), into a single Request SuperPacket and send the Request SuperPacket to the LUE (e.g., system 100) over a local area network (e.g., LAN 122). The LUE may combine, or multiplex, several DNS query message replies into a single Response SuperPacket and send the Response SuperPacket to the appropriate PE over the local area network. Generally, the maximum size of a Request or Response SuperPacket may be limited by the maximum transmission unit (MTU) of the physical network layer (e.g., Gigabit Ethernet). For example, typical DNS query and reply message sizes of less than 100 bytes and 200 bytes, respectively, allow for over 30 queries to be multiplexed into a single Request SuperPacket, as well as over 15 replies to be multiplexed into a single Response SuperPacket. However, a smaller number of queries (e.g., 20 queries) may be included in a single Request SuperPacket in order to avoid MTU overflow on the response (e.g., 10 replies). For larger MTU sizes, the number of multiplexed queries and replies may be increased accordingly.

Each multitasking PE may include an inbound thread and an outbound thread to manage DNS queries and replies, respectively. For example, the inbound thread may unmarshal the DNS query components from the incoming DNS query packets received over a wide area network and multiplex several milliseconds of queries into a single Request SuperPacket. The inbound thread may then send the Request SuperPacket to the LUE over a local area network. Conversely, the outbound thread may receive the Response SuperPacket from the LUE, de-multiplex the replies contained therein, and marshal the various fields into a valid DNS reply, which may then be transmitted over the wide area network. Generally, as noted above, other large-volume, query-based embodiments may be supported.

In an embodiment, the Request SuperPacket may also include state information associated with each DNS query, such as, for example, the source address, the protocol type, etc. The LUE may include the state information, and associated DNS replies, within the Response SuperPacket. Each PE may then construct and return valid DNS reply messages using the information transmitted from the LUE. Consequently, each PE may advantageously operate as a stateless machine, i.e., valid DNS replies may be formed from the information contained in the Response SuperPacket. Generally, the LUE may return the Response SuperPacket to the PE from which the incoming SuperPacket originated; however, other variations may obviously be possible.

In an alternative embodiment, each PE may maintain the state information associated with each DNS query and include a reference, or handle, to the state information within the Request SuperPacket. The LUE may include the state information references, and associated DNS replies, within the Response SuperPacket. Each PE may then construct and return valid DNS reply messages using the state information references transmitted from the LUE, as well as the state information maintained thereon. In this embodiment, the LUE may return the Response SuperPacket to the PE from which the incoming SuperPacket originated.

Figure 2:
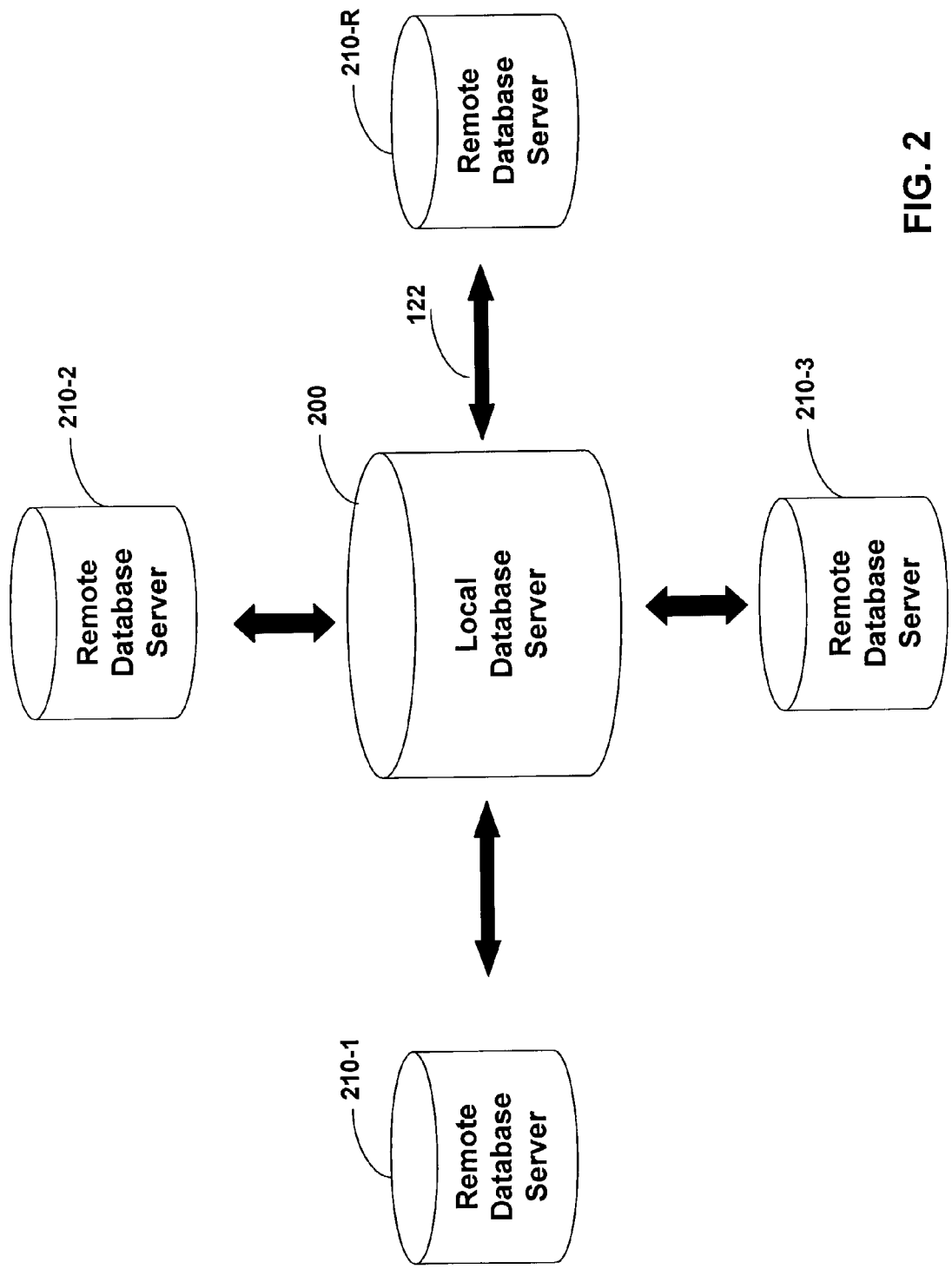
FIG. 2 is a block diagram of a system hub according to an embodiment of the present invention.

FIG. 2 is a block diagram of a hub and spoke architecture according to an embodiment of the present invention. Generally, the system may include a local database 200 (which may be included in central OLTP hub 140) and one or more remote databases 210 (which may be included in LUEs 100) connected to local database 200 via any connection mechanism, e.g., Internet or LAN 122. The databases may send and receive update data.

Figure 3:
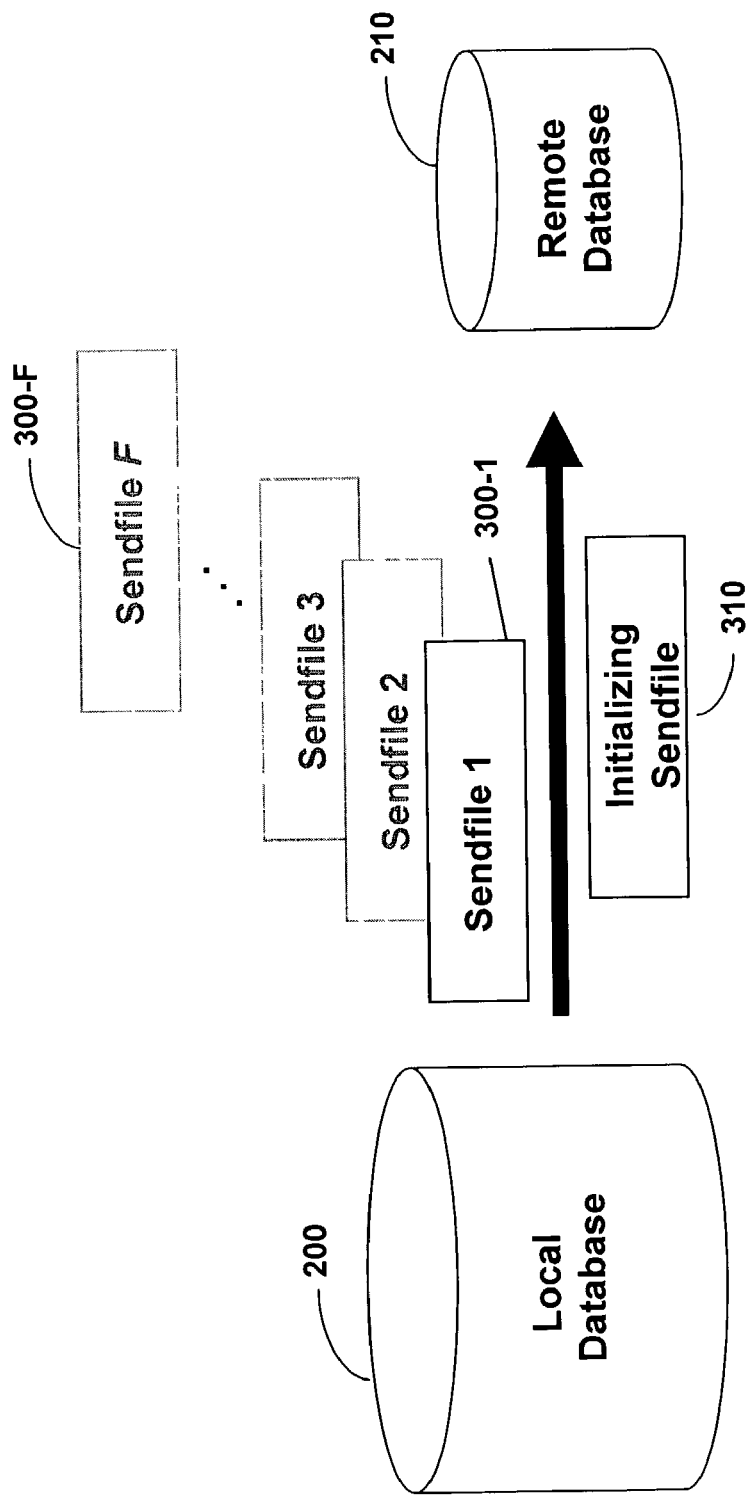
FIG. 3 illustrates an exemplary transmission of database updates from a local database to a remote database according to an embodiment of the present invention.

Referring to FIG. 3, in embodiments of the present invention, local database 200 sends F sendfiles 300-1 . . . 300-F and initializing sendfile 310 to remote database 210 in order to update remote database 210. The update files may be sent individually or in batches, such as multiple sendfiles 300, one sendfile 300 and one initializing sendfile 310, multiple sendfiles 300 and one initializing sendfile 310, sendfile 300 alone, or initializing sendfile 310 alone.

In an embodiment of the present invention, processor 104 may receive sendfile 300 and/or initializing sendfile 310 including updating data from local database 200. System 150 may receive sendfile 300 and initializing sendfile 310 at remote database 210 via communication interface 118. Processor 104 may then compare updating data in sendfile 300 or initializing sendfile 310 against corresponding data in remote database 210. If the data is different in remote database 210, then processor 104 may apply sendfile 300 or initializing sendfile 310 to remote database 210. Accordingly, remote database 210 may subsequently have updated data that matches the updating data in local database 200.

FIG. 4 shows sendfile 300 according to an embodiment of the present invention. The fields of file 300 may include, for example, a file identifier 400, the file generation time 402, the number of transactions N in the file 404, the total size of the file 406, a checksum or any such error-checking indicator 408, and transactions 410-1 . . . 410-N (including the transaction identifiers). These sendfile fields are examples meant to illustrate, and not limit, the scope of the embodiments of the present invention. Any useful field can be included in sendfile 300.

Sendfile 300 includes changes to local database 200 between two points in time. These changes may include, for example, additions of new identifiers (i.e., identifiers of data records), deletions of existing identifiers, modifications of one or more data records associated with a identifier, renaming of a identifier, a no-op, etc. One or more of these changes may occur in a sequence and may be called transactions. Sendfile 300 may include unique identifiers of these transactions. The transactions may be recorded in sendfile 300 in the order they occurred in local database 200. Additionally, for transactions including more than one change, the changes may be recorded within the transaction in the order they occurred in local database 200.

Generally, transaction identifiers may be assigned to transactions in any order. That is, the transaction identifiers need not monotonically increase over time. For example, two sequential transactions may have transaction identifiers of 10004 followed by 10002. Accordingly, the order that a transaction occurred may be determined by its placement in current file 300-F or its placement in a preceding file 300-(F-1). Generally, transactions may not span adjacent files 300 in order to fully complete a remote database update within one sendfile application. This prevents an interruption of an update due to a network delay, which could result in erroneous data at remote database 210.

FIG. 5 shows initializing sendfile 310 according to an embodiment of the present invention. The fields of initializing sendfile 310 may include, for example, a file identifier 500, the file generation time 502, the number of transactions N in the file 504, the total size of the file 506, a checksum or any such error-checking indicator 508, and the copy of the entire local database (data) 516. Initializing sendfile 310 may further include field 510, which is the file identifier 400 of the last sendfile 300 generated prior to the generation of file 310, and field 512, which is the identifier of the last transaction committed to local database 200 prior to the generation of initializing sendfile 310. The data in local and remote databases 200, 210 may be allocated to tables residing in databases 200, 210. Databases 200, 210 may support an arbitrary number of tables. So, when a database has tables, initializing sendfile 310 may include a field for each table indicating the number of records recorded in the table. For example, a domain name database may include a domain table and a nameserver table. Hence, initializing sendfile may include a field indicating the number of records in the domain table and a field indicating the number of records in the nameserver table. The field may specify, for example, the table name, a key used to index records in the table, and the number of records in the table. Additionally, initializing sendfile 310 may include a field indicating the version of initializing sendfile 310, usually 1.0. These initializing sendfile fields are examples meant to illustrate, and not limit, the scope of the embodiments of the present invention. Any useful field can be included in initializing sendfile 310.

Initializing sendfile 310 may include, for example, a read-consistent copy of the entire local database 200, as stated previously. Initializing sendfile 310 may become consistent with local database 200 at a point in time t between ts and ff, where ts is the time at which generation of initializing sendfile 310 begins and tf is the time at which the generation completes. As such, the only operation that may occur in initializing sendfile 310 is an "add" operation. That is, as initializing sendfile 310 is generated, copies of the entire local database 200 at time t may be recorded in initializing sendfile 310. Hence, an "add" operation may be performed to record local database 200 in initializing sendfile 310. Identifiers may be recorded in initializing sendfile 310 in any order. Alternatively, in the presence of foreign identifiers, referenced data records may be recorded before a referencing data record.

The addition of fields 510 and 512 may provide initializing sendfile 310 with some awareness of sendfiles 300 that may be generated and committed to remote database 210 while initializing sendfile 310 is being generated. However, the generations of sendfile 300 and initializing sendfile 310 may be decoupled from each other with respect to the lack of dependency of one on the other for generation. Such a structure and process may prevent a less efficient approach, in which sendfile generation and application may suspend until the initializing sendfile generation may be completed. By continuing to generate and apply sendfiles 300 while generating initializing sendfile 310, as in an embodiment of the present invention, the strong error-checking of sendfiles 300 may be done as well as the placing of constraints on remote database 210, e.g., unique constraints or foreign-identifier constraints, may be done. The placing of constraints may protect the integrity of the data in remote database 210 by disallowing transactions that violate relational models of remote database 210. For example, a unique constraint may prevent the same key from being stored in database 210 more than once.

Figure 6:
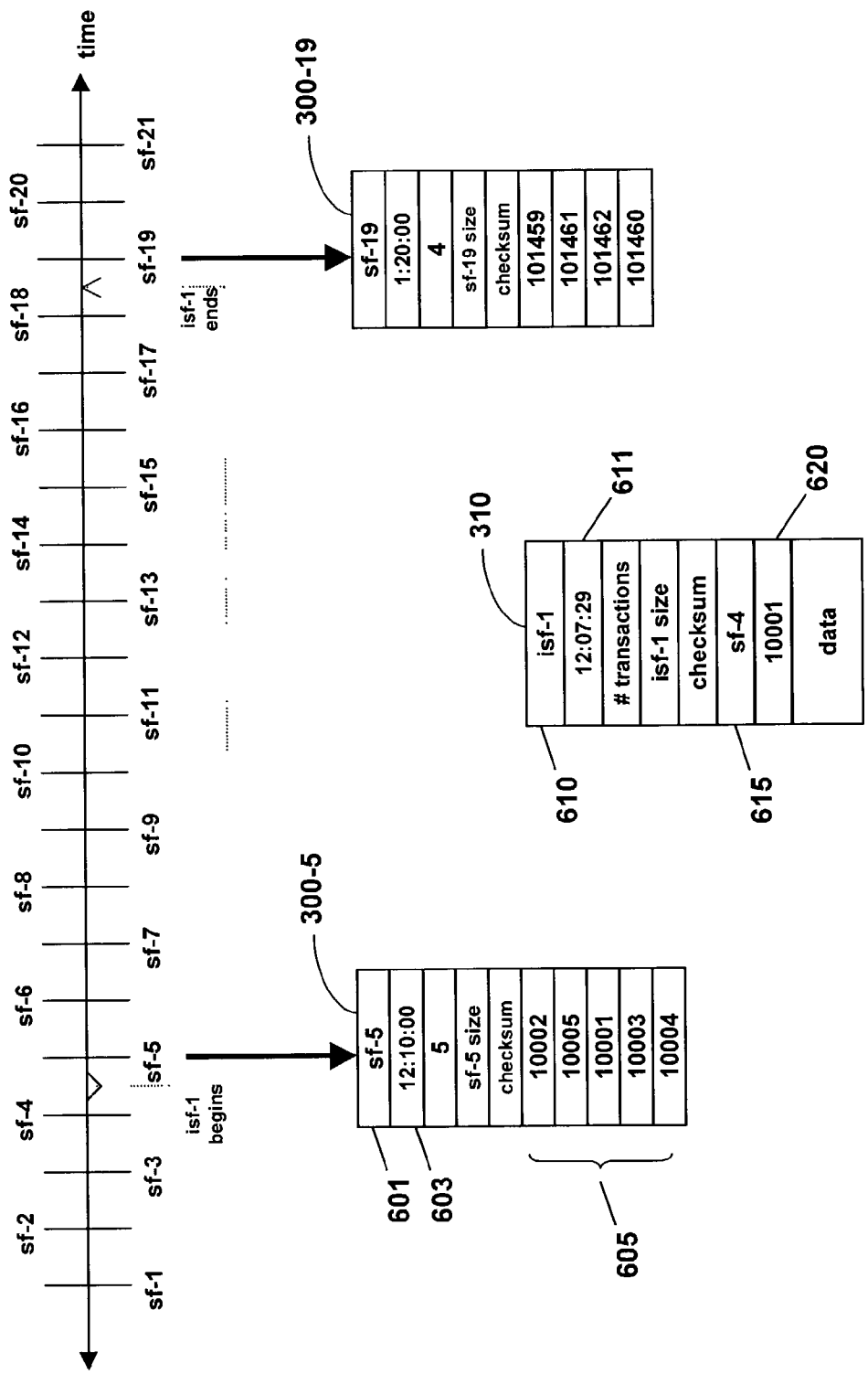
FIG. 6 is an illustrative timing chart of sendfile and initializing sendfile generation according to an embodiment of the present invention.

FIG. 6 is an illustrative timing chart of sendfile and initializing sendfile generation according to an embodiment of the present invention. In FIG. 6, sendfiles 300 (sf-1 through s-21) are generated at regular time intervals. In an alternate embodiment, sendfiles 300 may be generated at irregular time intervals. Generally, sendfile generation does not take the entire time interval. For example, if the files are generated at 5-minute intervals, it does not take the entire 5 minutes to complete generation of a file. Additionally, if changes occur in local database 200 while sendfile 300 is being generated, those changes will be captured in the next sendfile 300. For example, if sendfile sf-4 begins generation at 12:05:00 and completes at 12:05:02, then any changes to local database 200 that occur between 12:05:00 and 12:05:02 are captured in sendfile sf-5 (e.g., 300-5), which captures the time period from 12:05:00 to 12:10:00.

Sendfiles 300-5 and 300-19 are illustrated in FIG. 6. These files show, among other fields, a file identifier 601 (sf-5, sf-19), file generation time 603, and transaction identifiers 605 (e.g., 10002). Note that the transaction identifiers may not be ordered monotonically. As mentioned previously, the transaction identifiers may have random values. However, the associated transactions themselves are recorded in sendfile 300 in the order that they occurred in local database 200.

Since initializing sendfile 310 generation and sendfile 300 generation may be decoupled, initializing sendfile 310 may be generated at any time. For example, initializing sendfile 310 may be generated before, during, or after generation of sendfile 300. FIG. 6 illustrates initializing sendfile 310 being generated midway between the fourth and fifth sendfiles (e.g., sf-4 and sf-5).

In an embodiment, initializing sendfile 310 may include, among other fields, a file identifier 610 (isf-1), a file identifier 615 of the last sendfile generated before initializing sendfile generation, and the transaction identifier 620 of the last transaction committed before initializing sendfile generation. In this example, the last sendfile generated is sendfile sf-4 and the last transaction committed is transaction 10001. Initializing sendfile 310 begins generation 611 at 12:07:29. The first half of transactions in sendfile 300-5 (sf-5), transactions 10002, 10005, and 10001, have already been committed to local database 200 when initializing sendfile 310 begins generation. Accordingly, initializing sendfile 310 may have awareness of these transactions and may capture these transactions in initializing sendfile 310. However, initializing sendfile 310 may not be aware of subsequent transactions 10003 and 10004 that occur after initializing sendfile generation begins.

While initializing sendfile 310 may be generating, sendfiles beginning with sendfile 300-5 may continue to be generated at regular intervals. These files may be sent to remote database 210 and applied.

Initializing sendfile 310 may complete generation at 1:15:29, midway between generation of the 18th and 19th sendfiles 300 (sf-18 and sf-19), and may not affect generation of the 19th sendfile 300-19.

After receiving and loading initializing sendfile 310 at remote database 210, remote database 210 may not consider sendfiles generated prior to generation of initializing sendfile 310. This may be due to, for example, initializing sendfile 310 including all the changes to local database 200 that were recorded in prior sendfiles 300. In this example, remote database 210 may not need to consider the first through fourth sendfiles (sf-1 through sf-4). The changes recorded in these sendfiles sf-1 through sf-4 may also be recorded in initializing sendfile 310. These prior sendfiles (sf-1 through sf-4) may be deleted or, alternatively, archived. Similarly, remote database 210 may not consider transactions committed prior to generation of initializing sendfile 310 that were included in a sendfile 300 generated afterward. Initializing sendfile 310 may include these transactions when initializing sendfile 310 is generated. For example, remote database 210 may not need to consider the first three transactions 10002, 10005, 10001 of sendfile sf-5 because these transactions. These transactions recorded in sendfile sf-5 may also be recorded in initializing sendfile 310. These committed transactions may be deleted, or alternatively, archived.

Figure 7:
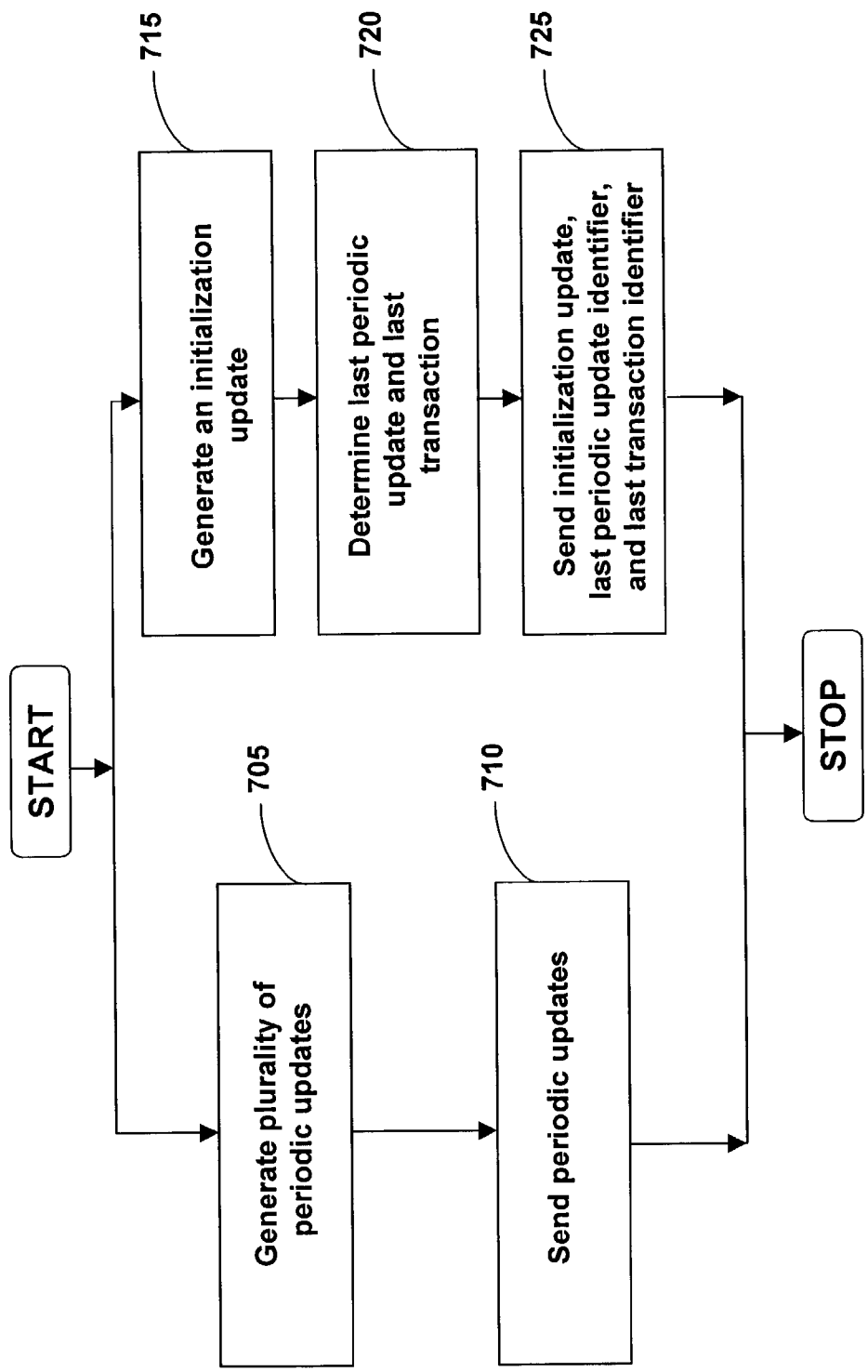
FIG. 7 is a flowchart of an embodiment of the present invention in which update files of a local database may be generated.

FIG. 7 is a flowchart of an embodiment of the present invention in which update files of a local database may be generated. A system may generate (705) a plurality of periodic updates based on incremental changes to the local database. Each update may include one or more transactions. The system may then send (710) the periodic updates to the remote database. While the periodic updates are being generated, the system may begin generating (715) an initialization update at a start time. The initialization update may include a version of the entire local database. The system may determine (720) the last periodic update generated prior to the start time and the last transaction committed prior to the start time. Then the system may send (725) the initialization update to the remote database. The initialization update may include an update identifier associated with the last periodic update generated and a transaction identifier associated with the last transaction committed.

For example, OLTP 140 may generate (705) sendfiles 300 at some regular or irregular time interval. OLTP 140 may then send (710) sendfiles 300 to remote database 210. While sendfiles 300 are being generated, OLTP 140 may begin generating (715) initializing sendfile 310 at a start time 611. Initializing sendfile 310 may include a copy of the entire local database 200. OLTP 140 may then determine (720) the last sendfile 300 generated prior to the start time 611 for generation of initializing sendfile 310 and the last transaction committed prior to the start time 611 for generation of initializing sendfile 310. OLTP 140 may then send (725) initializing sendfile 310 to remote database 210. Initializing sendfile 310 may include sendfile identifier 615 associated with the last sendfile 300 generated and a transaction identifier 620 associated with the last transaction committed.

Figure 8:
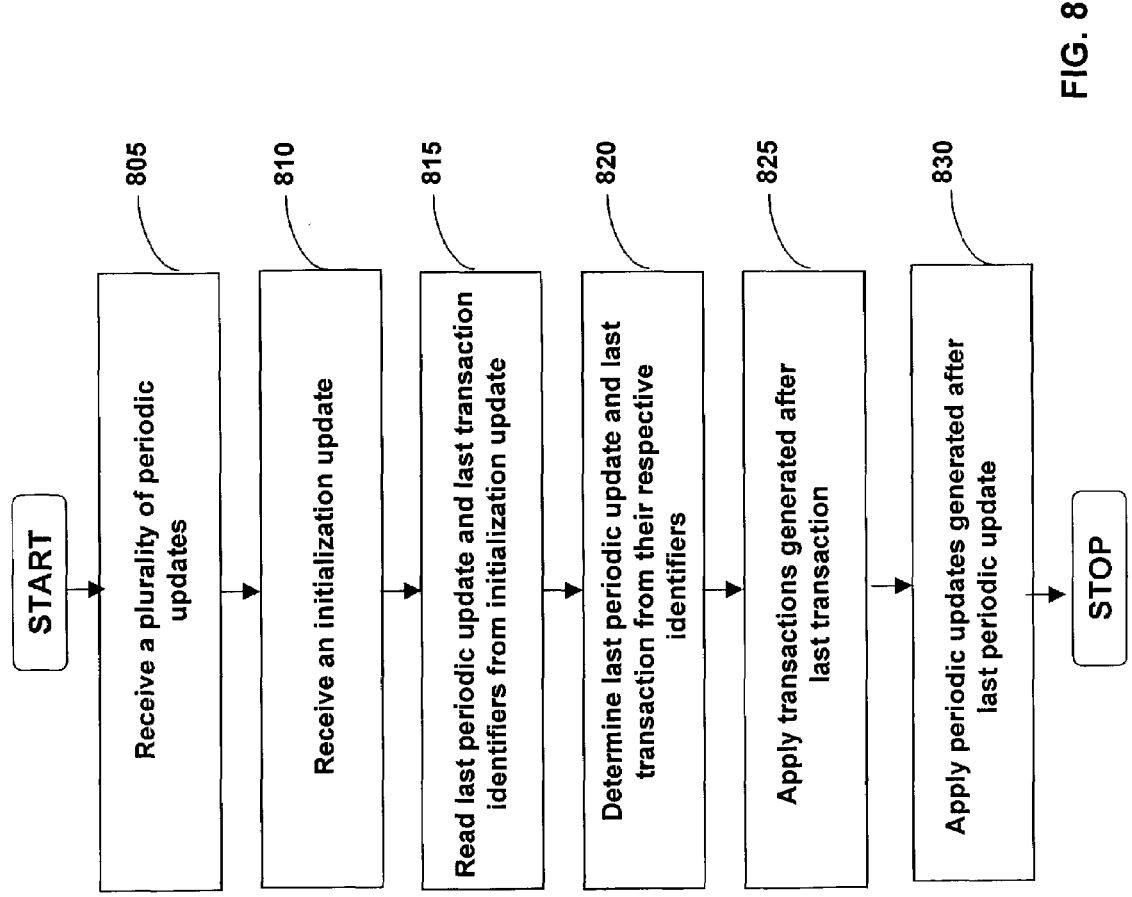
FIG. 8 is a flowchart of an embodiment of the present invention in which a remote database may receive update files from a local database.

FIG. 8 is a flowchart of an embodiment of the present invention in which a remote database may receive update files from a local database. A system may receive (805) a plurality of periodic updates. Each update may include one or more transactions. The periodic updates may be received individually or in batches. The system may receive (810) an initialization update at some time. The initialization update may include a version of the entire local database. The system may read (815) a last periodic update identifier and a last transaction identifier from the initialization update. The system may then determine (820) the last periodic update associated with the update identifier and the last transaction associated with the transaction identifier. The periodic update and transaction may be the last ones generated and committed, respectively, prior to generation of the initialization update. The system may apply (825) the remaining uncommitted transactions in the corresponding periodic update to the remote database. The system may then apply (830) the remaining periodic updates generated after the last periodic update to the remote database. Applying the initialization update advantageously makes up for any previously lost periodic updates.

For example, LUE 100 may receive (805) sendfiles 300 at some regular or irregular time interval. Sendfiles 300 may be received individually or in batches. LUE 100 may receive (810) initializing sendfile 310 at some time. LUE 100 may read (815) sendfile identifier 615 and transaction identifier 620 from initializing sendfile 310. LUE 100 may then determine (820) sendfile 300 associated with sendfile identifier 615 and transaction 605 associated with transaction identifier 620. The sendfile and transaction may be the last ones generated and committed, respectively, prior to initializing sendfile 310 generation. LUE 100 may apply (825) the remaining uncommitted transactions 605 in the corresponding sendfile 300 to remote database 210. LUE 100 may then apply (830) the remaining sendfiles 300 after the last sendfile sf-4 to remote database 210.

In an alternate embodiment, for example, LUE 100 may discard or archive sendfiles 300 that have not been applied to remote database 210 and/or that have a generation time 603 prior to initializing sendfile generation time 611. Sendfiles 300 discarded or archived may include sendfile sf-4 associated with sendfile identifier 615.

It may be understood that after initializing sendfile 310 is applied, any later sendfiles 300 that may have been already applied to remote database 210 may be lost because remote database 210 may become read-consistent with initializing sendfile 310. Accordingly, these later sendfiles 300 may be re-applied.

In an embodiment of the present invention, sendfiles 300 and initializing sendfile 310 may be sent from local database 200 to remote database 210 without acknowledgement, i.e., without an ACK/NACK signal to indicate that the files were successfully received. This advantageously reduces the overhead that an ACK/NACK signal may create.

In an alternate embodiment, an ACK/NACK signal may be sent from remote database 210 to indicate successful receipt of the files. In this embodiment, the ACK/NACK signal may be sent in systems with unreliable communications.

Figure 9:
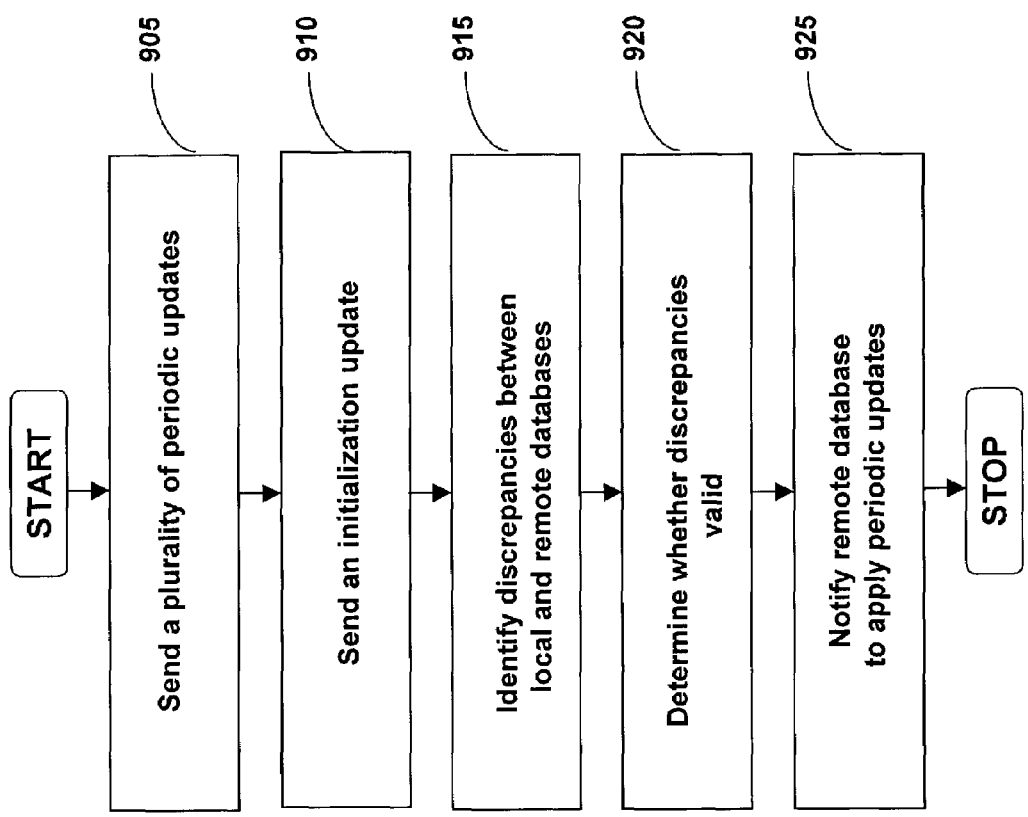
FIG. 9 is a flowchart of another embodiment of the present invention in which a remote database may receive and validate update files from a local database.

FIG. 9 is a flowchart of another embodiment of the present invention in which the system may validate the update files sent from the local database and received at the remote database. Here, a system may send (905) a plurality of periodic updates. Each update may include one or more transactions. The periodic updates may be sent individually or in batches. The system may send (910) an initialization update at some time and apply the initialization update to the remote database. The initialization update may include a version of the entire local database. The system may first identify (915) discrepancies between the local and remote databases by comparing the databases. The system may determine (920) whether the discrepancies are valid or erroneous. The system may then apply (925) the periodic updates to the remote database in accordance with an embodiment of the present invention. This embodiment advantageously may ensure that there are no errors in the remote database as a result of receiving updates from the local database.

For example, OLTP 140 may send (905) sendfiles 300 at some regular or irregular time interval to remote database 210. Sendfiles 300 may be sent individually or in batches. OLTP 140 may send (910) initializing sendfile 310 at some time to LUE 100 and LUE 100 may apply initializing sendfile 310 to remote database 210. OLTP 140 may compare local database 200 with remote database 210 and identify (915) discrepancies between them. OLTP 140 may then determine (920) whether the discrepancies are valid or erroneous. OLTP 140 may then notify LUE 100 to apply (925) sendfiles 300 to remote database 210 in accordance with an embodiment of the present invention. LUE 100 may then apply sendfiles 300 to remote database 210.

In an alternate embodiment, the system may apply both the sendfiles and the initializing sendfile prior to identifying and validating discrepancies. Alternatively, the system may apply both the sendfiles and the initializing sendfile after identifying and validating discrepancies.

It may be understood that the validation process may be performed on any data transmitted over a network from a source to a destination for the purpose of applying the transmitted data to the destination.

Figure 10A:
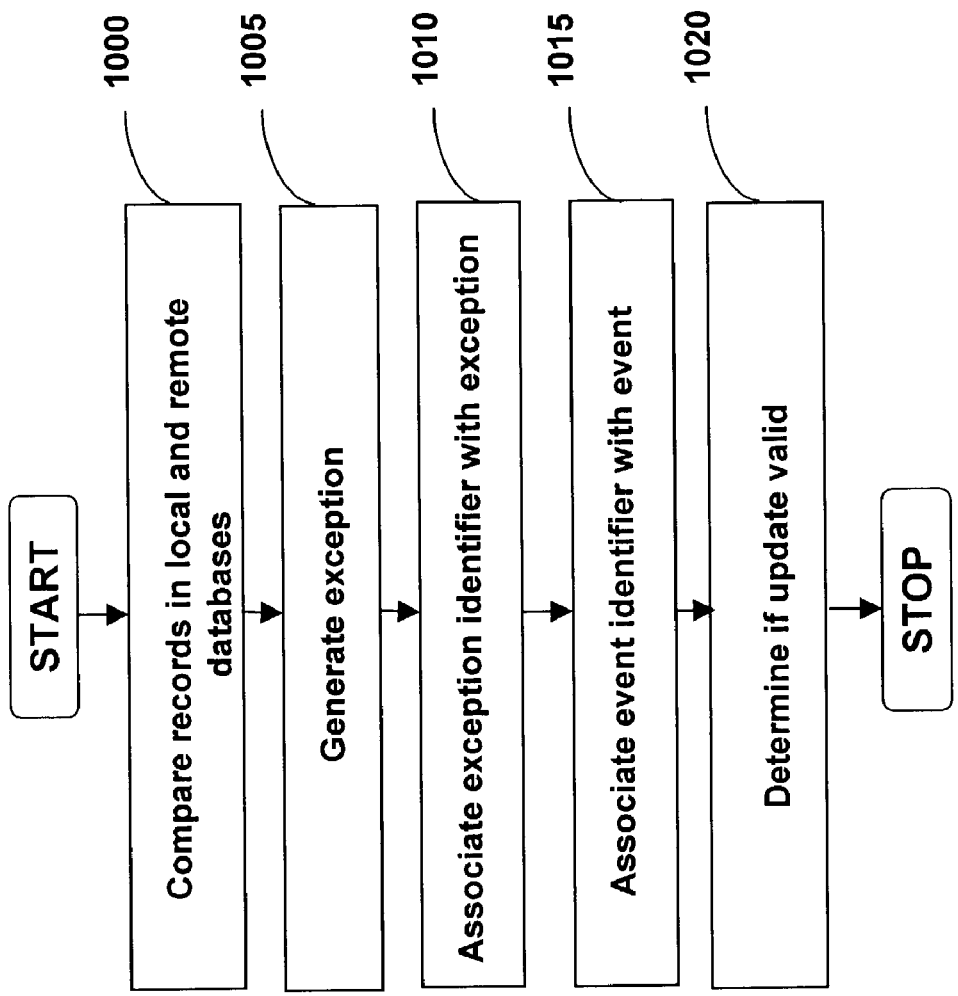
FIG. 10A is a flowchart of an embodiment of the present invention in which update files may be validated.

FIG. 10A is a flowchart of an embodiment of sendfile and initializing sendfile validation according to the present invention. After sending a plurality of periodic updates and an initialization update to the remote database, a system may validate these updates. Each update may include one or more transactions performed on the local database. Each transaction may include one or more events. An event is a database action or occurrence, e.g. addition, modification, deletion, etc., with respect to data in the database.

First, the system may compare (1000) a record in the remote database with a corresponding record in the local database. The system may generate (1005) an exception that describes a discrepancy between the remote and local database records, where an exception may be generated for each discrepancy. A discrepancy may be any difference in at least one data value between two versions of the same record. For example, a data record in the local database may be (12345, xyz.com, 123.234.345). A corresponding data record in the remote database, which is supposed to be the same, may be (12345, abc.com, 123.234.345). Accordingly, there is a discrepancy in the second data value of the record. Thus, an embodiment of the present invention may generate an exception that describes this discrepancy. An exception may describe a discrepancy by simply indicating that the discrepancy exists; by specifying the location of the discrepancy; by describing the difference between the two data values in the discrepancy, etc. A data record in the local database corresponds to a data record in the remote database (and vice versa) if the two records are supposed to contain the same data.

It may be understood that a discrepancy may refer to a difference between one or more data values in a record or the record in its entirety.

The system may associate (1010) an exception identifier with each exception, where the exception identifier may be associated with an identifier of the record. For example, the data record (12345, xyz.com, 123.234.345) may have an identifier d10. Accordingly, the exception identifier may also be d10. Each exception may be classified as belonging to any one of many exception (or discrepancy) types. An exception list may be formed to include the exception types and the exception identifier of the exception classified therein. The exception list and the different exception types will be described in detail later. The system may also associate (1015) an event identifier with each event in the update, where the event identifier may be associated with an identifier of the record. For example, the data record (12345, xyz.com, 123.234.345) may have an identifier d10. Accordingly, the event identifier may also be d10. Each event in the update may be found from an event history. An event history may be a listing, etc., of the events performed on the records in the local database over a time period. The event history will be described in detail later.

Figure 10B:
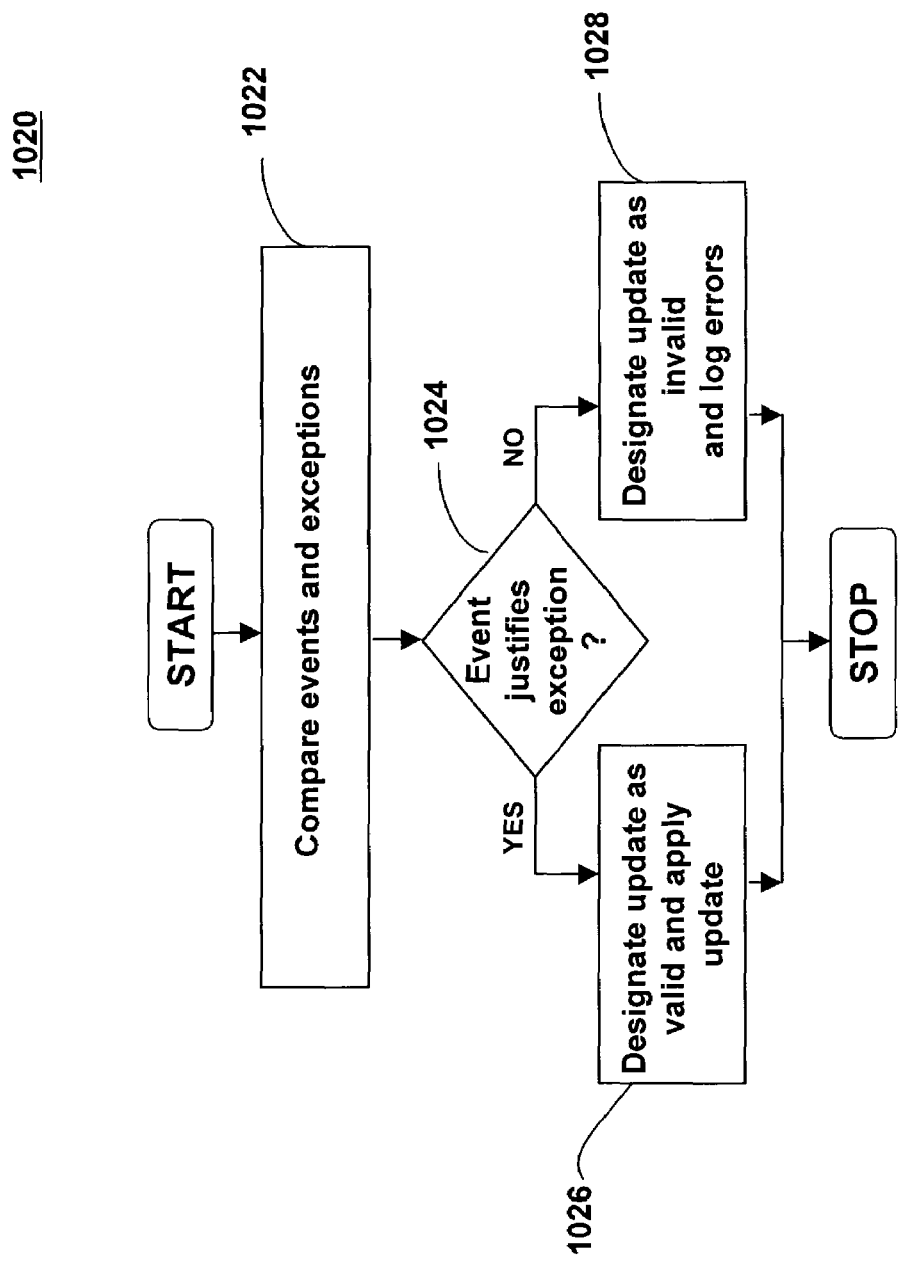
FIG. 10B is a flowchart of another embodiment of the present invention in which update files may be validated.

The system may then determine (1020) if the update of the record is valid. FIG. 10B is a flowchart of an embodiment of the validation determination. This determination may be done as follows. Each event may be compared (1022) with each exception. If each exception is justified (1024) by an event, then the update may be designated (1026) as valid and the update may be applied to the remote database. Otherwise, if each exception is not justified (1024) by an event, then the update may be designated (1028) as invalid and the exceptions may be logged as errors. An exception may be justified when an event identifier corresponds to the exception identifier and the associated event corresponds to a valid sequence of events associated with the exception type. The valid sequences will be described in detail later. If the exception is justified, the system may remove the exception identifier from the exception list. The exception being justified may indicate that the discrepancy is a valid one, e.g., the remote database has not yet received the update, but will indeed match the local database when the update is received.

During validation, the system may identify latent errors or faults in periodic and initialization updates. The system may ensure that these updates may be structurally and semantically correct, that these updates may be applied successfully without generating exceptions or otherwise halting ungracefully, that comparisons between the local and remote databases may accurately detect errors, and that high-profile data may not be accidentally deleted. The system may ensure that the periodic and initialization updates may be successfully applied to the remote database.

Many errors may advantageously be discovered by attempting to apply the updates to the remote database during validation. For example, data-centric errors, warnings that an object already exists in the remote database, or warnings that there is a foreign identifier violation may be discovered during an apply attempt. Thus, after performing the validation process of an embodiment of the present invention, the system may attempt to apply these updates to the remote database. The attempt may fail, which may indicate that there are additional errors in the updates that invalidate the updates. Accordingly, no further attempt may be made to apply these updates to the remote database.

In an alternate embodiment, an attempt may be made to apply at least one of the updates prior to performing validation. If the attempt fails, then the validation may be skipped and the update discarded. On the other hand, if the attempt succeeds, then the validation may be performed and the valid update kept and the invalid update logged for discrepancies.

In an exemplary embodiment, OLTP 140 may validate sendfiles 300 and initializing sendfiles 310 to ensure that sendfiles 300 and initializing sendfiles 310 may be successfully applied to remote database 210.

In alternate embodiments, network computers 121, LUE 100, or any combination of the existing systems may perform validation.

Referring to FIG. 10A, OLTP 140 may compare local database 200 and remote database 210 to determine any exceptions (or discrepancies) between them. Exceptions may include three types: data may be in remote database 210 and not in local database 200; data may be in local database 200 and not in remote database 210; or, corresponding data may be in local database 200 and remote database 210, but the data may be different. Of course, corresponding data may be in local database 200 and remote database 210 and the data may be the same, in which case, the data may be deemed valid, thus requiring no further processing by OLTP 140.

It may be understood that the discrepancy may refer to one or more data values in the record or the record in its entirety.

Figure 11:
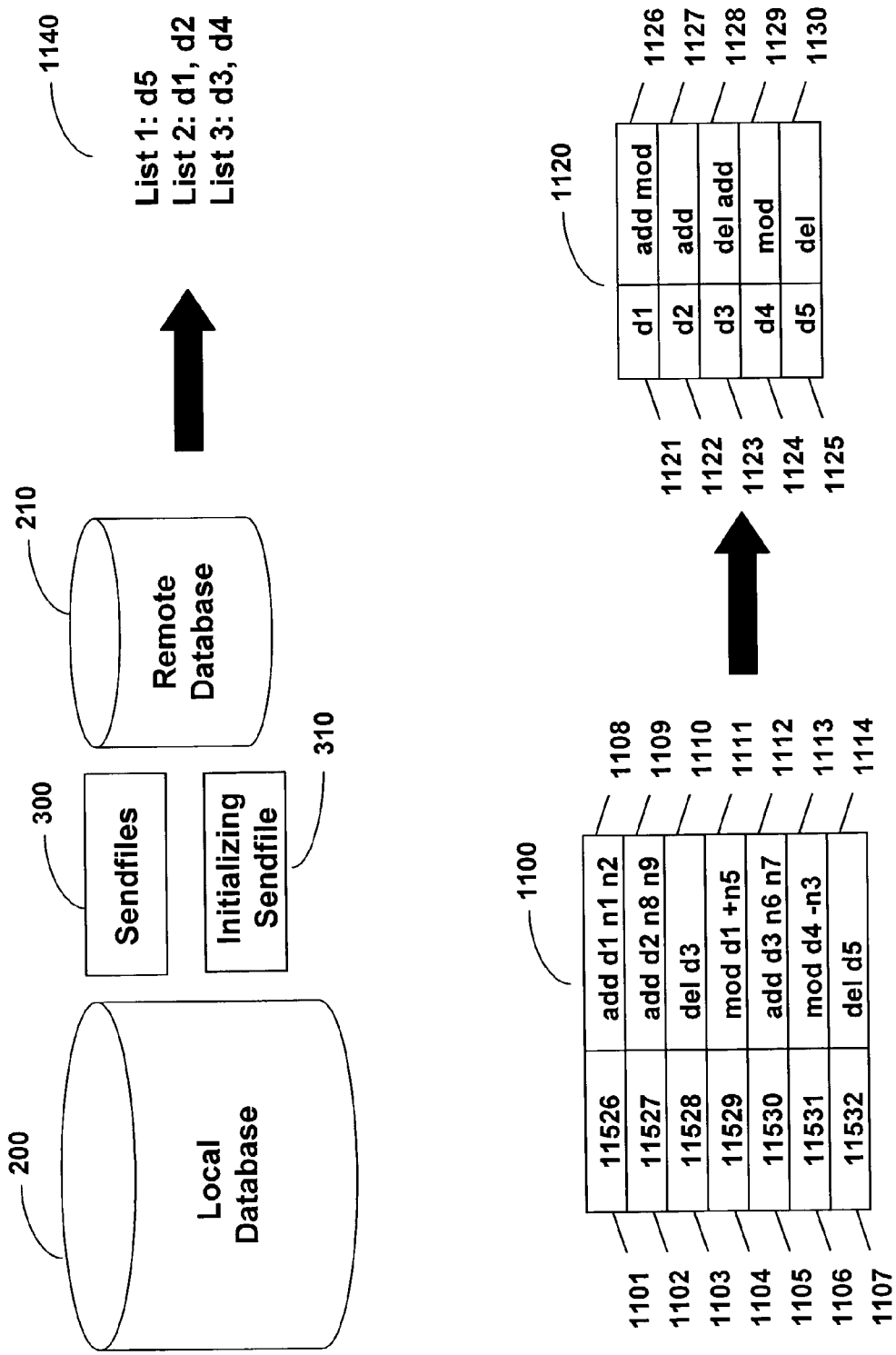
FIG. 11 is an illustration of update file validation according to an embodiment of the present invention.

Accordingly, OLTP 140 may compare (1000) corresponding records in local database 200 and remote database 210. OLTP 140 may generate (1005) an exception that describes a discrepancy between the record in remote database 210 and the record in local database 200, where an exception may be generated for each discrepancy. OLTP 140 may associate (1010) an exception identifier with each exception, where the exception identifier may be associated with an identifier of the record. An exception list may be formed to include the exception types and the exception identifier for the exception belonging to that exception type. In an embodiment, the exception may be designated as a "List 1" exception (or discrepancy) if the exception belongs to the first exception type, a "List 2" exception if the exception belongs to the second exception type, or a "List 3" exception if the exception belongs to the third exception type. FIG. 11 shows an exemplary exception list 1140.

It may be understood that the presence of an exception identifier on the exception list may not imply that sendfile 300 or initializing sendfile 310 is bad, since, for example, all three types of exceptions may legitimately occur due to a time delay between changes to local database 200 and updates applied to remote database 310. Such delay may be caused by network congestion, for example. As such, validation may provide a mechanism for weeding out legitimate from erroneous data.

For initializing sendfile 310, OLTP 140 may compare local database 200 and remote database 210 by performing a bi-directional full-table scan on both databases 200, 210. That is, all the data in local database 200 may be compared against all the data in remote database 210. Then, all the data in remote database 210 may be compared against all the data in local database 200. This advantageously provides an exhaustive comparison of databases 200, 210 to discover all discrepancies.

For sendfile 300, OLTP 140 may compare only the data records in local database 200 and remote database 210 that are recorded in sendfile 300. This advantageously provides a quick query to discover targeted discrepancies.

Alternatively, a random sampling of the data in initializing sendfile 310 and/or sendfile 300 may be conducted. OLTP 140 may then compare the randomly sampled data in local database 200 and remote database 210.

Exception list 1140 may correspond to missing events, for example, additions (add), modifications (mod), and deletions (del) to local database 200 that are inconsistent with remote database 210. So, to identify these candidate events, OLTP 140 may examine recent transactions committed to local database 200. Generally, for each transaction committed, an entry may be made in a log table stored in local database 200. The entry may include the identifier to the record that was changed, the transaction (or events) that changed the record (e.g., an add, mod, and/or del event), a log sequence number which indicates the ordering of the transaction, etc.

An exemplary log table 1100 is shown in FIG. 11. In this example, sendfile 300 includes transactions 1108–1114, shown in log table 1100. First entry 1101 indicates that, in first transaction 1108, data (nameservers) n1 and n2 were added to the data (domain) associated with identifier d1. Hence, the identifier is d1, the event is "add", and the log sequence number is 11526. Similarly, second entry 1102 indicates that, in second transaction 1109, data n8 and n9 were added to the data associated with identifier d2. Third entry 1103 indicates that, in third transaction 1110, the data associated with identifier d3 was deleted. Fourth entry 1104 indicates that, in fourth transaction 1111, the data associated with identifier d1 was modified to add data n5. For fifth transaction 1112, fifth entry 1105 indicates that data n6 and n7 were added to the data associated with identifier d3. For sixth transaction 1113, sixth entry 1106 indicates that the data associated with identifier d4 was modified to remove data n3. $R^{th}$ entry 1107, in $R^{th}$ transaction 1114, indicates that the data associated with identifier d5 was deleted.

Accordingly, as shown in FIG. 10A, OLTP 140 may associate (1015) an event identifier with each event in the update, where the event identifier may be associated with an identifier of the record. Each event in the update may be found from an event history. An event history, indexed and ordered by event identifier, may be generated from log table 1100. An exemplary event history 1120 is shown in FIG. 11. Here, first and fourth entries 1101, 1104 in log table 1100 indicate changes to the data associated with identifier d1. Thus, event history 1120 includes d1 identifier 1121 and two events 1126, "add" followed by "mod", performed on the data associated with identifier d1. Second entry 1102 indicates changes to the data associated with identifier d2. Thus, event history 1120 includes d2 identifier 1122 and an "add" event 1127. Event history 1120 includes d3 identifier 1123 and two events 1128, "del" followed by "mod", indicative of third and fifth entries 1103, 1105, which include changes to the data associated with identifier d3. Sixth entry 1106 indicates changes to the data associated with identifier d4.

Accordingly, event history 1120 includes d4 identifier 1124 and a "mod" event 1129. R$^{th}$ entry 1107 indicates changes to the data associated with identifier d5 and event history 1120 includes d5 identifier 1125 and a "del" event 1130. Identifiers 1121-1125 are ordered d1 through d5.

Referring again to FIG. 10A, OLTP 140 may determine (1020) if the update is valid. This determination may be performed, for example, according to an embodiment of FIG. 10B. First, OLTP 140 may compare (1022) event identifiers 1121–1125 with exception identifiers 1140 to determine which identifiers correspond. For example, in FIG. 11, d1 event identifier 1121 in event history 1120 corresponds to d1 exception identifier in "List 2" of exception list 1140. After finding a corresponding event and exception, OLTP 140 may determine (1024) if the event justifies the exception. The justification may be done as follows. For each event identifier 1121–1125 in event history 1120, OLTP 140 may determine whether each sequence of events 1126–1130 in event history 1120 is valid. This may be done, for example, by examining exception list 1140 to determine to which exception type each exception identifier belongs, determining what should be a valid sequence of events for that exception type, and then searching event history 1120 for the corresponding event identifier and the event identifier's sequence of events. Valid sequences for each exception type will be detailed below. If a sequence of events 1126–1130 in event history 1120 matches a valid sequence, then corresponding event identifier 1121–1125 has a valid sequence. As such, the exception associated with the exception identifier may be justified. And, the corresponding transaction 1108–1114 which includes that event identifier is a legitimate one and not erroneous. In this case, OLTP 140 may remove the exception identifier from exception list 1140.

A valid sequence of events for the "List 1" exception type may be (mod)* (del). This sequence may include a sequence of zero or more "mod" events followed by a "del" event followed by anything. The "List 1" exception type may correspond to data that may exist in remote database 210, but not in local database 200. In this case, data may have been recently deleted from local database 200 and the transaction not yet written to sendfile 300. Hence, sendfile 300 may not yet have been applied to remote database 210. So, the data may still exist in remote database 210. This may be considered to be a legitimate discrepancy because at some point sendfile 300 is expected to be generated and applied to remote database 210. So, if any such sequence 1126–1130 is found in event history 1120 for an exception identifier in List 1 of exception list 1140, then the corresponding transaction may be considered valid.

For example, in FIG. 11, d5 identifier 1125 and its associated data have been deleted from local database 200, as shown in Rth entry 1114 of log table 1100 and indexed in event history 1120. At the time of validation, d5 has been deleted from local database 200, but not from remote database 210. So, exception list 1140 includes identifier d5 in List 1. According to event history 1120, event 1130 associated with d5 identifier 1125 is "del". OLTP 140 may compare the valid sequence of a "List 1"exception type, i.e. (mod)* (del), against d5 event 1130 in event history 1120. Since the "List 1" valid sequence and event 1130 match, deletion transaction 1114 associated with identifier d5 may be considered legitimate and not an error. Accordingly, identifier d5 may be removed from exception list 1140.

A valid sequence of events for the "List 2" exception type may be (add). This sequence may include an "add" event followed by anything. The "List 2" exception type may correspond to data that exist in local database 200, but not in remote database 210. In this case, data may have been recently added to local database 200 and the transaction not yet written to sendfile 300. Hence, sendfile 300 may not yet have been applied to remote database 210. So, the data may not exist in remote database 210. This may be also considered to be a legitimate discrepancy because at some point sendfile 300 is expected to be generated and applied to remote database 210. Accordingly, if any such sequence 1126–1130 is found in event history 1120 for an exception identifier in List 2 of exception list 1140, then the corresponding transaction may be considered valid.

Referring again to FIG. 11, d1 and d2 identifiers 1121, 1123 may be associated with data that was initially added to local database 200, for example. Since their sequences of events 1126, 1127 begin with "add" events, d1 and d2 identifiers 1121, 1123 match the valid sequences for a "List 2" exception type. Accordingly, transactions 1108, 1109 including these identifiers may be considered valid and identifiers d1 and d2 removed from exception list 1140. Note that d3 identifier 1123 also includes an "add" event in its sequence 1128. However, the "add" event is not the first in sequence 1128. Accordingly, sequence 1128 does not qualify as a "List 2" type. Additionally, since d3 is not designated in List 2 of exception list 1140, OLTP 140 may not check it for the List 2 valid sequence.

Valid sequences of events for the "List 3" exception type may be (del) (add) or (mod). These sequences may include a "del" event followed by an "add" event followed by anything or a "mod" event followed by anything. The "List 3" exception type may correspond to data that exist in both databases 200, 210, but is different. In this case, data may have been recently modified in local database 200 and the transaction not yet written to sendfile 300. Hence, sendfile 300 may not yet have been applied to remote database 210. So, the data associated with the identifier may not yet be modified in remote database 210. Again, this may be considered to be a legitimate discrepancy because at some point sendfile 300 is expected to be generated and applied to remote database 210. Accordingly, if any such sequence 1126–1130 is found in event history 1120 for an exception identifier in List 3 of exception list 1140, then the corresponding transaction may be considered valid.

For example, in FIG. 11, d3 and d4 identifiers 1123, 1124 may be associated with data that was modified in local database 200. In the case of d3 identifier 1123, d3 identifier 1123 and its data were initially deleted and then added back with new data, such that its sequence of events 1128 may include "del" followed by "add". In the case of d4 identifier 1124, the d4 data was modified to remove data, such that its sequence of events 1129 may include "mod". Since these sequences of events 1128, 1129 match the valid sequences for a "List 3" exception type, their corresponding transactions 1110, 1112, 1113 may be considered valid and identifiers d3 and d4 removed from exception list 1140.

Referring to FIG. 10B, if all the exceptions indicated by their identifiers in exception list 1140 have been justified (1024) by events, i.e., if exception list 1140 is empty, OLTP 140 may designate (1026) sendfile 300 or initializing sendfile 310 as valid and notify LUE 100 to apply sendfile 300 or initializing sendfile 310 to remote database 210. LUE 100 may then apply sendfile 300 or initializing sendfile 310 to remote database 210.

Conversely, if all the exceptions have not been justified (1024) by events, i.e., if exception list 1140 is not empty, then the remaining exceptions may indicate errors in sendfile 300 or initializing sendfile 310. Accordingly, OLTP 140 may designate (1028) sendfile 300 or initializing sendfile 310 as invalid and log the errors in an error file.

In an alternate embodiment, for example, if sendfile 300 or initializing sendfile 310 was designated as invalid, after a predetermined period of time, OLTP 140 may repeat the validation process on invalid sendfile 300 or initializing sendfile 310 to ensure that the discrepancies are indeed errors. This predetermined delay allows the network more time to transmit any slow sendfiles 300, 310 and databases 200, 210 more time to become read-consistent.

In an embodiment of the present invention, the data in remote database 210 may "lag" the data in local database 200 by a significant time period. Accordingly, in order to compare databases 200, 210 and detect errors, databases 200, 210 may be made read-consistent at the same point in time such that they are exact copies of each other. Generally, remote database 210 may be rolled forward to local database 200, where the data in remote database 210 may be made essentially the same as the data in local database 200.

Accordingly, to speed up validation, any currently generated initializing sendfile 310 and subsequent sendfiles 300 may be applied to remote database 210 prior to beginning validation. As such, the number of discrepancies may be significantly reduced. This batch processing of the sendfiles 300, 310 may be referred to as chunking. The first and last of these sendfiles 300, 310 in the chunk may be called low and high water marks, respectively. The first chunk, called the initial chunk, may include initializing sendfile 310. All the next chunks, called terminal chunks, may include only sendfiles 300.

Chunking may provide for group validation rather than validation in isolation. Accordingly, if an error is detected in a chunk, the entire chunk may be designated invalid, not just the sendfile 300 or initializing sendfile 310 where the error occurred.

The mechanisms and methods of embodiments of the present invention may be implemented using a general-purpose microprocessor programmed according to the teachings of the embodiments. The embodiments of the present invention thus also includes a machine readable medium, which may include instructions, which may be used to program a processor to perform a method according to the embodiments of the present invention. This medium may include, but is not limited to, any type of disk including floppy disk, optical disk, and CD-ROMs.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer implemented method for validating an update to a record in a remote database over a network, the update including at least one event, comprising:
   comparing the record in the remote database with a corresponding record in a local database;
   generating an exception that describes a discrepancy between the remote database record and the local database record, for each discrepancy;
   associating an exception identifier with each exception, wherein each exception identifier is associated with an identifier of the record;
   associating an event identifier with each event in the update, wherein each event identifier is associated with an identifier of the record; and
   determining whether the update is valid by comparing the events and exceptions that correspond to the record;
   wherein the types of exceptions include:
   a first exception type in which the record is in the remote database and not in the local database;
   a second exception type in which the record is in the local database and not in the remote database; and
   a third exception type in which the record is in the local database and the remote database and a value of a field of the record in the local database is different than the value of the same field of the record in the remote database.

2. The method of claim 1, wherein the update to the record is valid if every exception corresponding to the record is justified by an event corresponding to the record.

3. The method of claim 1, wherein the event justifies the exception if: the event is a deletion of the record from the local database and the exception is the first exception type, the event is an addition of the record to the local database and the exception is the second exception type, the event is a modification of the record in the local database and the exception is the third exception type, or the event is a deletion from followed by an addition of the record to the local database and the exception is the third exception type.

4. The method of claim 1, further comprising: repeating the method for validating the update a given amount of time after the update was determined to be invalid, if the update is determined to be invalid.

5. The method of claim 1, wherein the comparing includes:
   comparing the entire local database against the entire remote database.

6. A computer implemented method for validating a remote database, comprising:
   sending to the remote database a plurality of periodic updates based on incremental changes to a local database, each of the plurality of periodic updates having at least one transaction;
   sending to the remote database an initialization update including a version of the local database as the local database existed at a start time, wherein the initialization update is applied to the remote database;
   identifying discrepancies between the local database and the remote database;
   determining whether the discrepancies are valid; and
   notifying the remote database to apply the periodic updates that have a start time later than the start time of the initialization update;
   wherein the discrepancies include: a first discrepancy type in which a record is in the remote database and not in the local database;
   a second discrepancy type in which a record is in the local database and not in the remote database; and
   a third discrepancy type in which the record is in the local database and the remote database and a value of a field of the record in the local database is different than the value of the same field of the record in the remote database.

7. The method of claim 6, further comprising: repeating the method for validating the update a given amount of time after the update was determined to be invalid, if the update is determined to be invalid.

8. A computer system for validating an update to a record in a remote database over a network, wherein the update includes at least one event, the system, comprising:
   at least one processor coupled to the network; and a memory coupled to the processor, the memory including a database and instructions adapted to be executed by the processor to implement a method for validating the update of the record in the remote database over the network, the method including:

comparing the record in the remote database with a corresponding record in a local database, generating an exception that describes a discrepancy between the remote database record and the local database record, for each discrepancy, associating an exception identifier with each exception, wherein each exception identifier is associated with an identifier of the record, associating an event identifier with each event in the update, wherein each event identifier is associated with an identifier of the record, and determining whether the update is valid by comparing the events and exceptions that correspond to the record;

wherein the types of exceptions include:

a first exception type in which the record is in the remote database and not in the local database;

a second exception type in which the record is in the local database and not in the remote database; and a third exception type in which the record is in the local database and the remote database and a value of a field of the record in the local database is different than the value of the same field of the record in the remote database.

9. The system of claim 8, wherein the update to the record is valid if every exception corresponding to the record is justified by an event corresponding to the record.

10. The system of claim 8, wherein the event justifies the exception if:

the event is a deletion of the record from the local database and the exception is the first exception type, the event is an addition of the record to the local database and the exception is the second exception type, the event is a modification of the record in the local database and the exception is the third exception type, or the event is a deletion from followed by an addition of the record to the local database and the exception is the third exception type.

11. The system of claim 8, wherein, if the update is determined to be invalid, the processor repeats the method for validating the update a given amount of time after the update was determined to be invalid.

12. The system of claim 9, wherein the processor compares the entire local database against the entire remote database.

13. The system of claim 8, further comprising: at least one remote processor coupled to the network; and a remote memory coupled to the remote processor, the remote memory storing the remote database and instructions adapted to be executed by the remote processor to: create a new element based on new information received from the database over the network, and without restricting search access to the remote database, write a pointer to the new element to the remote database using a single uninterruptible operation.

14. The system of claim 13, wherein the instructions are further adapted to: physically delete an existing element after the pointer is written to the database.

15. The system of claim 13, wherein the single uninterruptible operation is a store instruction.

16. The system of claim 15, wherein the remote processor has a word size of at least n-bytes, the remote memory has a width of at least n-bytes and the store instruction writes n-bytes to a remote memory address located on an n-byte boundary.

17. A machine readable medium including program instructions adapted to be executed by a processor to implement a method for validating an update to a record in a remote database over a network, wherein the update includes at least one event, the method comprising:

comparing the record in the remote database with a corresponding record in a local database; generating an exception that describes a discrepancy between the remote database record and the local database record, for each discrepancy;

associating an exception identifier with each exception, wherein each exception identifier is associated with an identifier of the record;

associating an event identifier with each event in the update, wherein each event identifier is associated with an identifier of the record; and determining whether the update is valid by comparing the events and exceptions that correspond to the record;

wherein the types of exceptions include:

a first exception type in which the record is in the remote database and not in the local database;

a second exception type in which the record is in the local database and not in the remote database; and a third exception type in which the record is in the local database and the remote database and a value of a field of the record in the local database is different than the value of the same field of the record in the remote database.

18. The machine readable medium of claim 17, wherein, if the update is determined to be invalid, the processor repeats the method for validating the update a given amount of time after the update was determined to be invalid.

19. The machine readable medium of claim 17, wherein the update to the record is valid if every exception corresponding to the record is justified by an event corresponding to the record.

* * * * *